J. F. HIGBEE.
VALVE SEATING MACHINE.
APPLICATION FILED MAY 7, 1910.
983,228.
Patented Jan. 31, 1911.
4 SHEETS—SHEET 2.
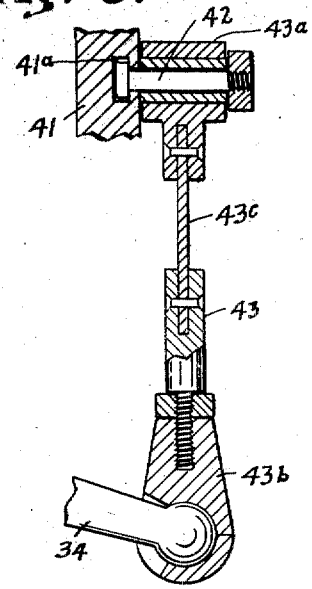
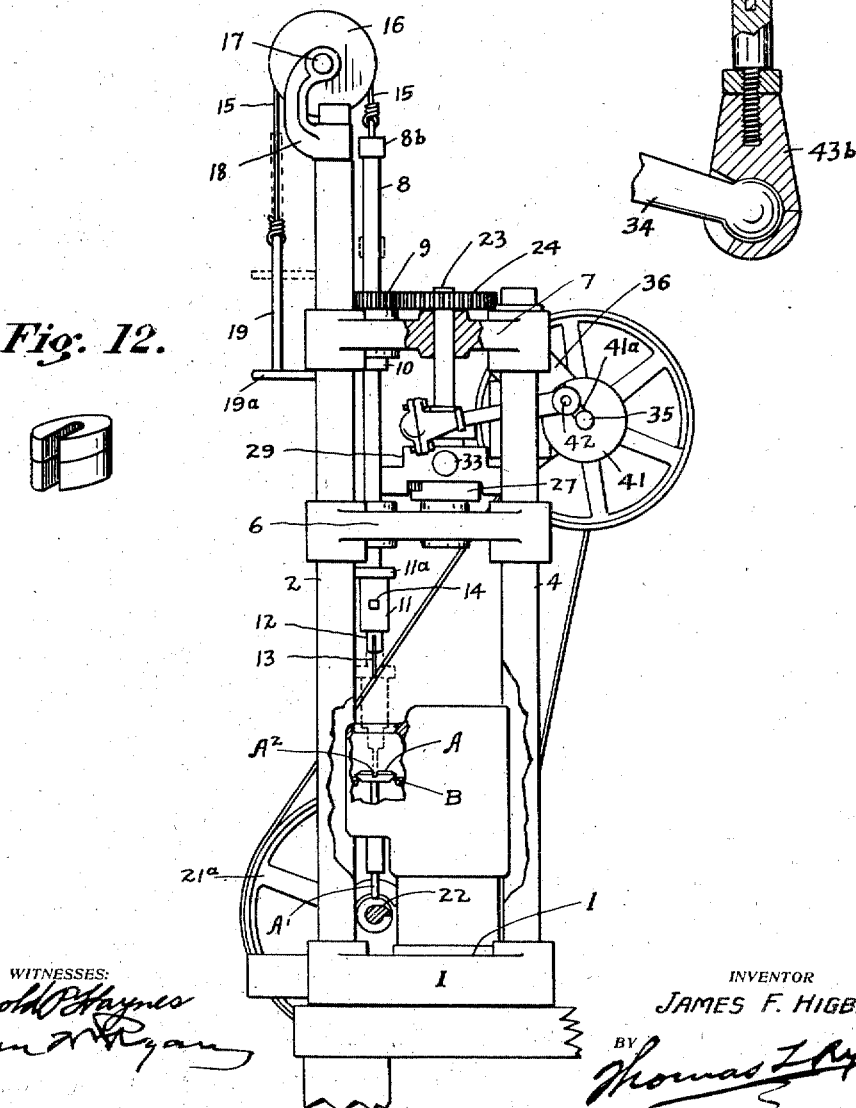
INVENTOR
JAMES F. HIGBEE,
ATTORNEY

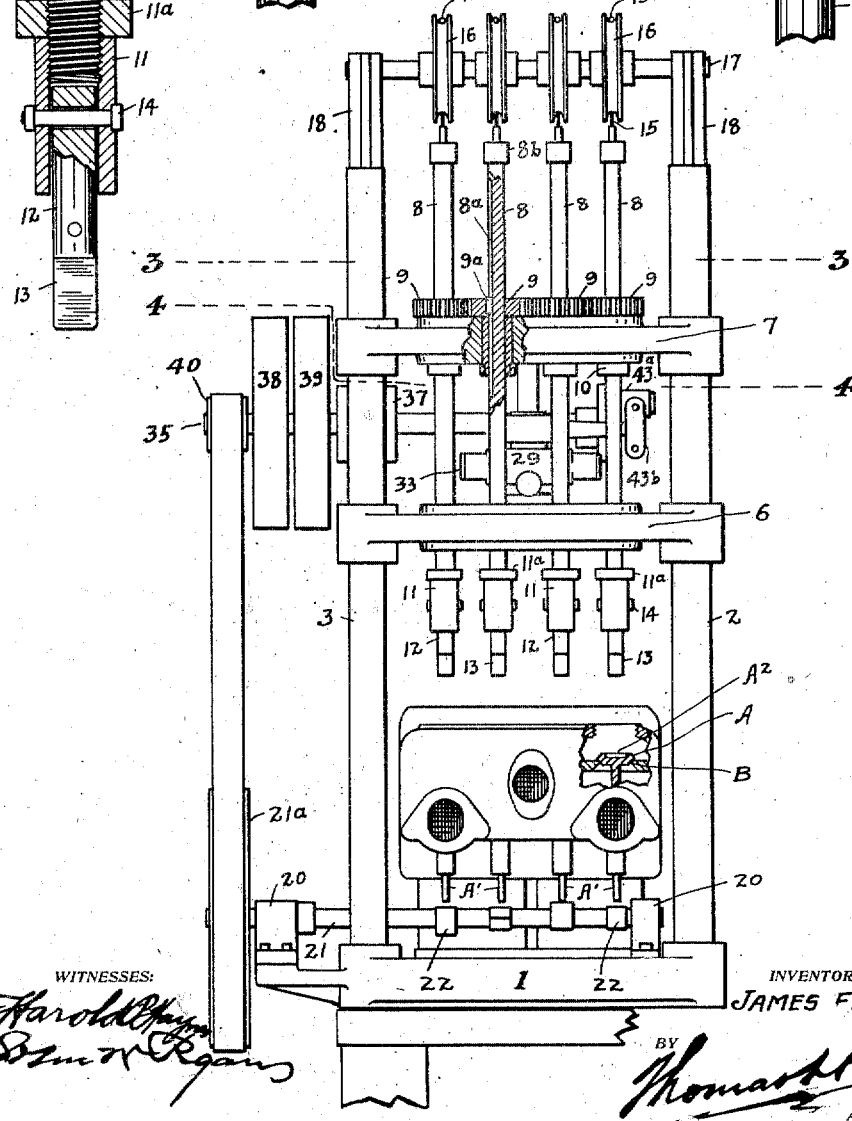

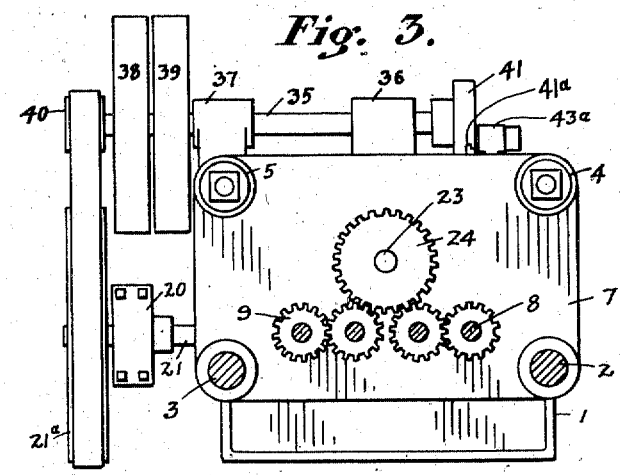
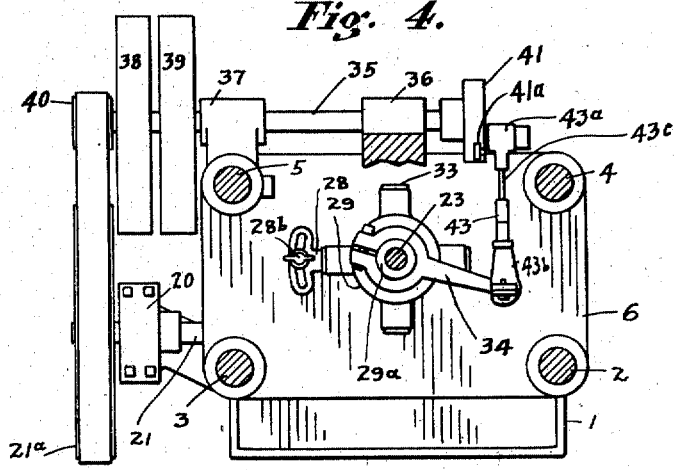

J. F. HIGBEE.
VALVE SEATING MACHINE.
APPLICATION FILED MAY 7, 1910.
983,228.
Patented Jan. 31, 1911.
4 SHEETS—SHEET 4.
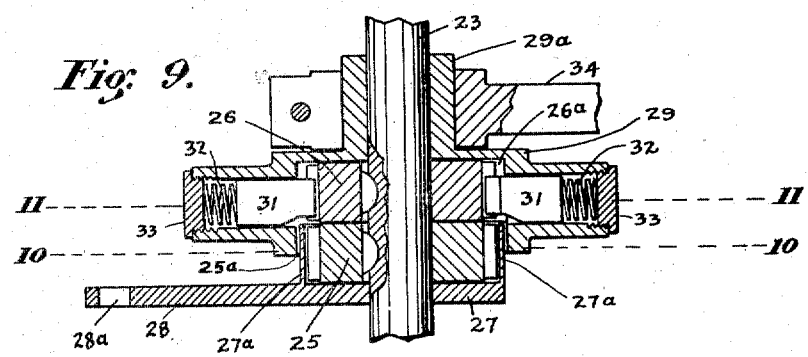
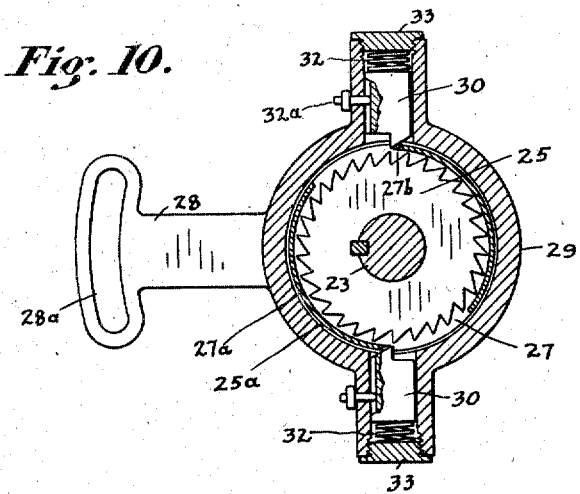
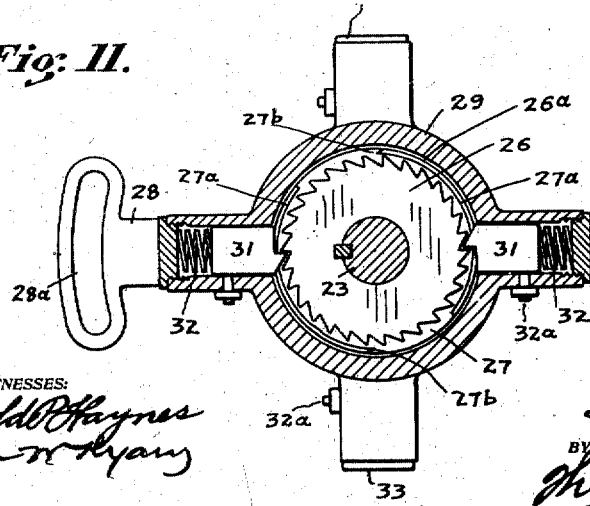
WITNESSES:
Harold P. Haynes
John W. Ryan
INVENTOR
JAMES F. HIGBEE.
BY Thomas L. Ryan
ATTORNEY

UNITED STATES PATENT OFFICE.

JAMES F. HIGBEE, OF MUNCIE, INDIANA, ASSIGNOR OF ONE-HALF TO WILLIAM M. HIGBEE, OF LIMA, OHIO.

VALVE-SEATING MACHINE.

983,228. Specification of Letters Patent. Patented Jan. 31, 1911.

Application filed May 7, 1910. Serial No. 559,923.

*To all whom it may concern:*

Be it known that I, JAMES F. HIGBEE, a citizen of the United States, residing at Muncie, in the county of Delaware and State of Indiana, have invented a new and useful Valve-Seating Machine, of which the following is a specification.

This invention relates to machine tools.

In the manufacture of automobiles and kindred motor vehicles having for their source of power the internal combustion or heat engine, the work of constructing such motors, to the end that they may develop the highest efficiency and will be dependable in operation, and not liable to derangement, has created the necessity of the most precise, positive and accurate coöperation of the several parts. The almost universally adopted type of engine of the character referred to, embodies the cylinder and valve chest construction illustrated in Figure 1 and in Fig. 2 of the drawings herein; the said valve chests which are formed integral with the cylinder being arranged in alinement and provided with the class of valve shown. This valve includes the valve-head A adapted to rest on the seat B. Through a suitable opening in the top wall of the chest is passed the valve-head which has a stem A' capable of being engaged by proper actuating means whereby the intermittent opening and closing of the valve is accomplished. For the engine to work efficiently it is indispensable that there shall be the most perfect contact of the meeting surfaces of the valve-head A and its seat B; to accomplish this it is necessary, after the ordinary machining of same has been completed, to seat each valve perfectly. For the purpose of facilitating such operation a central slit A² is provided in the valve-head A capable of receiving the end of a suitable implement or tool, for rotating the valve-head on its seat. By introducing between the valve-head and its seat a fluid or viscous mass containing grit or grinding powder, and then by manual means, moving the valve-head rotatively, that being the method hitherto practiced, the seating of the valve-head may be accomplished; however, only after much labor and the expenditure of considerable time and skill. This method of seating such valves besides being very costly on account of the high degree of skill necessarily employed, is, after all, uncertain in its results, and moreover requires so much time that the completion of these engines with any degree of rapidity is impracticable.

The primary purpose of my invention is to provide a machine which will operate to seat valves or parts of the character described, accurately, dependably and rapidly.

Further objects are to provide in such a machine, such improved form, combination and arrangement of parts that the machine will be durable, not liable to get out of repair, and which will be easy to use, and economical of manufacture.

The foregoing objects, and other purposes which will be obvious as the specification of my invention proceeds, are accomplished by the new construction, combination and arrangement of parts described in this specification, defined in the appended claims and illustrated in the accompanying drawing it being understood of course that minor changes may be made in the forms of the several parts and in the details of construction, within the scope of my invention as defined by the appended claims, without departing from the nature of my invention nor sacrificing any of its advantages.

Corresponding parts are designated by similar characters of reference throughout the several views in the drawings, wherein—

Fig. 1 is a front view, and Fig. 2 is a side view of my improved valve-seating machine; in Fig. 1 the handle-bars 19 being not shown. Fig. 3 is a plan view taken on the line 3—3 in Fig. 1. Fig. 4 is a plan view taken on the line 4—4 in Fig. 1. Fig. 5 is a detailed sectional view of the top of the tool-carrier-bar. Fig. 6 is a detailed sectional view of a portion of the frame-plate 7. Fig. 7 is a detailed sectional view of the bottom end of the tool-carrier-bar. Fig. 8 is a detached enlarged sectional view of the pitman. Fig. 9 is a vertical central sectional view of the operating mechanism. Fig. 10 is a plan view taken on the line 10—10 in Fig. 9. Fig. 11 is a plan view taken on the line 11—11 in Fig. 9. Fig. 12 is an enlarged view of weights suitable to be used for the purpose herein described.

This invention consists essentially of a base or frame element on which the engine-part or other structure that is to be operated upon, may be fastened, tool-carrier members capable of being oscillated and also of being shifted rotatively, and to be held in removable engagement with the valve-heads, and means to intermittently cause a separation of the contact of the valve-head and its seat; the operation of the invention being such that a passing away from the contacting surfaces of the used grit mass, is always possible, and the valve will be seated accurately and uniformly and with rapidity and precision.

In this new machine which is shown of the preferred construction in detail and general form, the base 1 has the bulk and proportion as shown, suitable to receive and to have fastened thereto, the structure that is to be operated upon. The uprights 2, 3, 4 and 5 having their bottoms secured to the base 1, and the frame-plates 6 and 7 which are supported by the said uprights, constitute the frame of the machine. The arrangement of the tool-carrier-bars 8 is in pairs as shown, the distances between them center to center, being the same as the distances between the valve-heads A, center to center. These tool-carrier-bars, as shown in Fig. 6, fit slidingly in the bores of the gear-wheels 9, but by a feather $9^a$ which will engage the longitudinal groove $8^a$ in the tool-carrier-bar, each of the bars will be actuated by its respective gear wheel 9. A suitable construction whereby these gear wheels may perform their functions, is shown in detail in Fig. 6, the hubs being journaled in suitable bores therefor in the frame-plate 7, and by the flange-collars 10 which are secured to the bottoms of said hubs, the gear wheels while free to move rotatively will be held against vertical movement. The lower portions of the said tool-carrier-bars 8 will move freely in the bearings therefor in the frame-plate 6. The tool-member to be carried by said bars 8 is illustrated in detail in Fig. 7. A sleeve 11 is screwed onto the bottom of the tool-carrier-bar 8 and will be secured by the lock-nut $11^a$. 12 designates a stub which has a toe 13. This stub is of diameter slightly smaller than that of the bore of the sleeve 11, and is supported loosely by the transverse pin 14, it will have sufficient freedom of movement so that the toe 13, when the tool-carrier-bar, while in action, is let down to the lowermost or dotted line position shown in Fig. 2, will readily get into engagement with the slit $A^2$ of the valve-head. In the form of stub shown herein suitable for engagement with a valve or part having a plain slit $A^2$, the said toe 13 consists of a blade secured in a suitable opening in the bottom portion of the stub. The toe of such tool-member when worn or injured may be easily replaced independently of the tool-carrier-bar and without the necessity of removing the sleeve 11.

The tool-carrier-bars 8 which are of substantial weight are supported on cables 15 which are passed up over the grooved wheels 16 journaled on the shaft 17. This shaft 17 has its ends fastened in the blocks 18 that are secured to the tops of the uprights 2 and 3. The free ends of the cables are provided with the handle-bars 19. By drawing down these handle-bars the tool-carrier-bars will be raised. The degree of pressure downwardly exerted by these tool-carrier-bars may be varied by the use of weights, as shown in Fig. 12, which may be disposed on the tool-carrier-bars at the lock nuts $11^a$, or may be supported on the flanges $19^a$ of the said handle-bars. To support the tool-carrier-bars in raised inoperative position the handle bars are placed with their flanges $19^a$ in engagement with the lower frontal edge of the frame-plate 7.

To afford proper connections between the tool-carrier-bars and the cables 15 is the function of the detail shown in Fig. 5. The cap $8^b$ having a central perforation, is secured to the top of the bar; between the annular ball race provided on the head $15^a$ of the cable, and a similar race in the underside of the said cap are balls $15^b$. The tool-carrier-bars are thus capable of the rotative shifting without effect on the cables.

Journaled in pillow blocks 20, and in alinement with the valve-heads A, is a shaft 21 having cams 22 underneath and adapted to engage the stems A' whereby the valve-heads A are lifted momentarily from their seats B. The pulley $21^a$ of this shaft is belted to the drive shaft of the machine. In the operation of seating the valve-heads, a semi-fluid mass consisting of oil and grinding-powder such as emery or carborundum is introduced in such manner that it will be worked down through the valve, the same passing between the valve-head and its seat. It is essential that there shall be such motion imparted to the valve-heads in the moving of same in contact with the seat, that the meeting surfaces will be ground rapidly and accurately, and that possibility of the lodgment or adhesion abnormally of particles of grit, to the valve-head or the seat, even temporarily, shall be overcome. To accomplish the above purpose the mere oscillatory motion of the valve-head is not sufficient, but there must be a shifting rotatively of the valve-head on its seat together with the aforesaid oscillatory movement. These advantages are gained by my invention, by effecting in combination with the frequent lifting of the valve-head from its seat, an oscillatory movement of the valve-head, and a shifting movement of the valve-head in a rotary direction whereby there is oscillation of same at different relative positions on the seat. To accomplish these movements is the function of the novel driving and actuating mechanism for the tool-carrier-bars, shown in this application.

In suitable bearings that form a part of the frame-plates 6 and 7 are journaled the upper and lower ends respectively, of the vertical shaft 23, the gear wheel 24 being secured thereto and adapted to mesh with one gear wheel of each pair of the gear wheels 9 as shown in Fig. 3. Keyed to the lower portion of the vertical shaft 23 are two ratchet wheels arranged reverse to each other and which are designated herein as the ratchet wheel 25 and the ratchet wheel 26.

27 designates a disk-shaped head-plate which by a suitable central bore therein is engaged by the vertical shaft 23. This head-plate is disposed underneath the ratchet wheel 25, as shown in Figs. 10 and 11, and has the mutilated vertical wall portions $27^a$ concentric with and adjacent to the peripheral face of the ratchet wheel, the reverse ends of the wall portions $27^a$ are beveled and designated $27^b$, as shown in Fig. 10. The arm 28 which is formed integral with the said head-plate has its outer end provided with a circumferential slot $28^a$ which will be engaged by a set screw $28^b$ that is carried by the frame-plate 6, and whereby the head plate 27 may be secured at different adjusted positions. The function of this head-plate is to cause the retraction of the pawls from the ratchet wheel 25 as will be hereinafter described.

29 designates a housing, circular in form, and provided with the hub $29^a$ the bore of which fits loosely on the vertical shaft 23, as shown in detail in Fig. 9. The enlarged bore of this housing is of suitable diameter to afford clearances $25^a$ and $26^a$, for the wall portions $27^a$ and the ratchet wheel 26 respectively. In the bores of radial extensions carried by this housing are slidingly disposed the pair of pawls 30 to engage the teeth of the ratchet wheel 25, and a pair of pawls 31 to engage the ratchet wheel 26. These pawls are urged into normal engagement with the teeth of the ratchet wheels, by the coil-springs 32 kept in place by the caps 33 which will be secured to the ends of the extensions. An arm 34 having connection with reciprocating means is secured to the hub $29^a$ of the housing.

35 designates a drive-shaft journaled in the pillow-blocks 36 and 37, and upon which said drive-shaft are carried suitable loose pulley 38 and the drive pulleys 39 and 40. Carried by the drive-shaft is a crank-wheel 41 having a radial slot $41^a$ in which is adjustably retained the wrist-pin 42. A suitable form of construction of this wrist-pin whereby it is capable of being secured at different adjusted positions in the slot $41^a$ is shown in detail in Fig. 8. 43 designates a pitman having its head $43^a$ journaled on the said wrist-pin, and the head $43^b$ forms a ball-and-socket jointure with the end of the arm 34; the body-portion $43^c$ of this pitman is made of resilient material such as spring steel to lend to the pitman the proper flexibility.

To practice my invention, the engine-part or structure having the valves of substantially the character and arrangement as shown in the drawings, is fastened in place on the base 1. The tool-carrier-bars may be let down to the operative position with the toes 13 in engagement with the valve-heads, either before or after the machine is in motion. Through the master gear wheel 24, the motion of the vertical shaft 23 will be transmitted to the tool-carrier-bars. By the pawls 30 at the ratchet wheel 25, and the pawls 31 at the ratchet wheel 26, the motion of the housing which is actuated by the arm 34, will cause an oscillatory movement of the vertical shaft. By virtue however of the function performed by the head plate 27, one pair of pawls, the pawls 30, is caused to be retracted in advance of the moment when the housing 29 will have carried them to the limit of their idle stroke, the result being that one of the two strokes constituting the oscillatory movement transmitted by the housing, when delivered to the vertical shaft 23, is shorter than the other. Thus the valve-head will have imparted to it oscillatory movement and at the same time it will be shifted to different positions rotatively. That is to say, the valve-head while being oscillated on its seat, will at the same time be caused to progress in a rotative direction, so that the entire extent of the contacting surfaces of the valve-head and its seat will be ground equably and uniformly. The frequent momentary lifting of the valve-head permits the passing of the grit mass whereby there is a uniform quantity and distribution thereof and liability of the same to clog or lodge on the contacting surfaces is overcome. The degree of pressure of the tool-carrier-bars on the valve-heads may be regulated by the use of the counterbalancing weights 12 to be attached to the handle-bars 19, or to the tool-carrier-bars. Other advantages of my invention are that a machine constructed in accordance with its principles is capable of being enlarged to operate any number of tool-carrier-bars, and may be capable of receiving for operation thereon, structures having valves of number more or less and of sizes of different dimensions than those shown in the drawings. The head-plate 28 being capable of adjustment to different positions the length of the idle stroke or shift of the pawls may be so regulated that the length of the shifting movement of the tool-carrier-bars may be varied. The adjustment also afforded by the adjustable wrist pin 42 makes possible the variation of the length of the oscillatory stroke of the housing 29, the effect of which is obvious.

The function of the studs 32ª carried by the radial extensions of the housing, the inner ends of which studs engage loosely the suitable grooves in the pawls, is to retain the pawls against displacement rotatively. It is obvious that each of the ratchet wheels could be operated by one pawl or by a plurality of pawls, the latter arrangement being preferred because of the more positive and substantial transmission of motion from the housing accomplished thereby.

What I claim as my invention, and desire to secure by Letters Patent, is—

1. In a machine of the kind described, the combination of a tool carrier bar to removably engage and by its weight to press the one piece of work against the other piece of work, means to oscillate the said tool carrier bar so that one of the two strokes constituting the oscillatory movement will be shorter than the other, means to momentarily separate the valve head from its seat without stopping the oscillation of the tool carrier bar.

2. In a grinding machine, a device arranged above and to removably engage and by its weight to press the valve head against its seat, means to oscillate said device so that one of the two strokes constituting the oscillatory movement thereof will be shorter than the other, means underneath the valve to at intervals raise the valve head from its seat without affecting the operation of said oscillating means.

3. In a machine of the kind described, a tool carrier bar to removably engage and by its weight to press the one piece of work against the other piece of work, means to oscillate the said tool carrier bar so that one of the two strokes constituting the oscillatory movement thereof will be shorter than the other, means to move and sustain the tool carrier bar out of actual engagement with the work without stopping the oscillatory movement of the tool carrier bar.

4. In a grinding machine, the combination with a tool carrier bar to engage the valve head, means to oscillate the tool carrier bar so that one of the two strokes constituting the oscillatory movement thereof will be shorter than the other, means to momentarily separate the valve head from its seat without stopping the oscillatory movement of the tool carrier bar, means to move and sustain the tool carrier bar out of engagement with the valve head without stopping the oscillation of said tool carrier bar.

5. In a grinding machine, a tool carrier bar, opposed wheels, a housing to be oscillated adjacent to said wheels, gearing between the wheels and the tool carrier bar, means to transmit one stroke entire of the two strokes constituting the oscillatory movement of the housing, to one of the wheels, and to transmit a part only of the other stroke, to the other one of said opposed wheels.

6. In a grinding machine, a tool carrier bar, opposed ratchet wheels, a housing to be oscillated adjacent to the ratchet wheels, pawls carried by the housing to engage the ratchet wheels, gearing between the ratchet wheels and the tool carrier bar, a device to cause a retraction of the pawl of the one ratchet wheel at a moment before the pawl of the other ratchet wheel has been carried to the limit of the oscillatory stroke of the housing.

7. In a grinding machine, a tool carrier bar, opposed ratchet wheels, a housing to be oscillated adjacent to the ratchet wheels, pawls carried by the housing to engage the ratchet wheels, gearing between the ratchet wheels and the tool carrier bar, a device to cause a retraction of the pawl of the one ratchet wheel at a moment before the pawl of the other ratchet wheel has been carried to the limit of the oscillatory stroke of the housing, means to hold said device at different positions so that the moment of retraction of said pawl may be varied.

8. In a grinding machine, the combination of a tool carrier bar adapted to be moved into engagement with and to be disengaged from the valve head, opposed ratchet wheels, a housing or arm to be oscillated adjacent to the ratchet wheels, pawls carried by the housing to engage the ratchet wheels, gearing between the ratchet wheels and the tool carrier bar, a device to cause a retraction of the pawl of the one ratchet wheel at a moment before the pawl of the other ratchet wheel has been carried to the limit of the oscillatory stroke of the housing, means to separate the valve head from its seat without stopping the operation of the tool carrier bar.

9. A machine of the kind described, means to operate the tool-carrier bars including a shaft, gearing between the shaft and the tool-carrier-bars, opposed ratchet wheels secured to said shaft, a housing to be oscillated adjacent to said ratchet wheels, pawls carried by the housing to engage each of the ratchet wheels, and means to oscillate the housing.

10. In a machine of the kind described, means to operate the tool-carrier-bars including a shaft, gearing between the shaft and the tool-carrier bars, opposed ratchet wheels secured to the shaft, a housing to be oscillated adjacent to the said ratchet wheels, pawls carried by the housing to engage each of the ratchet wheels, a member disposed adjacent to one of the ratchet wheels to cause a retraction of its pawl at a moment prior to the completion of the oscillatory stroke of the housing.

11. A machine of the kind described, including a base upon which to fasten the structure to be operated upon, tool-carrier-bars arranged vertically and capable of being lowered into engagement and to rest upon the valve-heads, a shaft, gearing between the shaft and the tool-carrier-bars, opposed ratchet wheels secured to the shaft, a housing to be operated adjacent to the said ratchet wheels, pawls carried by the housing to engage each of the ratchet wheels, a member disposed adjacent to one of the ratchet wheels to cause a retraction of its pawl at a moment prior to the completion of the oscillatory stroke of the housing, and means to momentarily separate the valve-heads from their seats without stopping the operation of the tool-carrier-bars.

12. A machine of the kind described, including a frame, gear wheels mounted on said frame and free to move rotatively but held against vertical movement, tool-carrier-bars feathered to said gear wheels, and capable of being raised and lowered, a vertical shaft, a mastergear wheel secured thereto and meshing with said gear wheels, opposed ratchet wheels secured to said vertical shaft, one above the other, a housing having its hub journaled on said vertical shaft, pawls carried by the said housing to engage both of the ratchet wheels, a head-plate adjacent to and having wall-portions concentric to one of the ratchet wheels and which when the housing is moved will engage one of the said pawls to retract it from its working engagement with the ratchet wheel, means to hold the head-plate at different adjusted positions with reference to the relative position of the housing, and means to oscillate the housing.

13. A machine of the kind described, comprising a frame, gear wheels mounted on said frame and free to move rotatively but held against vertical movement, tool-carrier-bars feathered to said gear wheels, a vertical shaft, a master gear wheel secured thereto and meshing with said gear wheels, opposed ratchet wheels secured to said vertical shaft, a housing having its hub journaled on said vertical shaft, pawls carried by the said housing to engage both of the ratchet wheels, a head-plate having wall-portions concentric to one of the ratchet wheels and which when the housing is moved will be engaged by one of the said pawls to retract it from its working engagement with the ratchet wheel, an arm secured to the housing, a driving shaft, a crank wheel carried thereon, a connecting-rod to connect the crank wheel and the said arm, substantially as described.

14. In a machine of the kind described comprising tool-carrier-bars, a shaft, gearing between the shaft and the said tool-carrier-bars, opposed ratchet wheels carried by said shaft, a housing having pawls to engage said ratchet wheels, and means to oscillate the said housing including a driving shaft, a crank wheel carried thereon and having a slot therein, a wrist-pin retained adjustably in said slot, an arm extended from said housing, a resilient connecting rod between the said wrist pin and the said arm and having ball and socket jointure with the latter, substantially as described.

15. In a grinding machine, a frame including a base upon which to secure the structure embodying the valves that are to be operated upon, gear wheels mounted upon said frame and free to move rotatively but which are held against vertical movement, tool carrier bars feathered to said gear wheels, a vertical shaft journaled in said frame, a master gear wheel secured thereto and meshing with said gear wheels, opposed ratchet wheels secured to said vertical shaft, a housing having its hub journaled on said vertical shaft, pawls carried by the said housing to engage both of the ratchet wheels, a head-plate having wall portions terminated adjacent to one of the ratchet wheels and which wall-portions when the housing is moved, will be engaged by one set of the said pawls to retract them from their working engagement with their ratchet wheel, an arm secured to the housing, a driving shaft, a crank wheel thereon, a connecting-rod to connect the crank wheel with the said arm, a transverse shaft journaled at a position underneath the valves, cams on the said shaft to engage the stems of the valve heads, power transmitting means between the driving shaft and the cam shaft.

In testimony whereof I affix my signature in presence of two witnesses.

JAMES F. HIGBEE.

Witnesses:
THOMAS L. RYAN,
HAROLD P. HAYNES.